(12) United States Patent
Tavares Andre

(10) Patent No.: US 11,524,343 B2
(45) Date of Patent: Dec. 13, 2022

(54) MACHINING STATION

(71) Applicant: CHETOCORPORATION, S.A., Santiago Da Riba-ul (PT)

(72) Inventor: Sergio David Tavares Andre, Vale de Cambra (PT)

(73) Assignee: CHETOCORPORATION, S.A., Loureiro Oaz (PT)

(*) Notice: Subject to any disclaimer, the term of this patent is extended or adjusted under 35 U.S.C. 154(b) by 38 days.

(21) Appl. No.: 17/269,332

(22) PCT Filed: Aug. 29, 2019

(86) PCT No.: PCT/IB2019/057287
§ 371 (c)(1),
(2) Date: Feb. 18, 2021

(87) PCT Pub. No.: WO2020/044281
PCT Pub. Date: Mar. 5, 2020

(65) Prior Publication Data
US 2021/0245266 A1 Aug. 12, 2021

(30) Foreign Application Priority Data

Aug. 29, 2018 (PT) .......................................... 111113

(51) Int. Cl.
*B23B 41/02* (2006.01)
*B23Q 11/08* (2006.01)
(Continued)

(52) U.S. Cl.
CPC .............. *B23B 41/02* (2013.01); *B23Q 11/08* (2013.01); *B23Q 1/621* (2013.01);
(Continued)

(58) Field of Classification Search
CPC ... Y10T 408/56245; Y10T 409/305544; Y10T 409/305656; Y10T 409/308792;
(Continued)

(56) References Cited

U.S. PATENT DOCUMENTS 6,116,830 A * 9/2000 Azema ...................... F16P 3/02
409/134
6,884,009 B2 * 4/2005 Maeda ................. B23Q 7/1431
409/137
(Continued)

FOREIGN PATENT DOCUMENTS

DE 4318830 C1 1/1995
EP 1595639 A1 11/2005
WO 2013139518 A1 9/2013

OTHER PUBLICATIONS

International Search Report and Written Opinion for Corresponding International Application No. PCT/IB2019/057287 dated Jan. 17, 2020; 7 pages.

*Primary Examiner* — Boyer D Ashley
*Assistant Examiner* — Michael Vitale
(74) *Attorney, Agent, or Firm* — Lucas & Mercanti, LLP

(57) ABSTRACT

A machining station especially arranged to carry out deep drill and milling operations is disclosed. The machining station now proposed presents a specific structural arrangement, enables the incorporation, contrary to already existing stations, of an axis dedicated to deep drilling, favoring the use of deep drill tools under ideal conditions, without size restriction. Accordingly, the station is comprised of an operating base, on which there lays an operating module and an arrangement module. This new arrangement for the machining station is therefore more versatile and adaptable to the specificities programmed for each part to be machined.

10 Claims, 3 Drawing Sheets

(51) Int. Cl.
*B23Q 1/62* (2006.01)
*B23Q 3/155* (2006.01)

(52) U.S. Cl.
CPC . *B23Q 2003/15537* (2016.11); *Y10S 408/705* (2013.01); *Y10T 409/30392* (2015.01); *Y10T 409/305656* (2015.01); *Y10T 409/308792* (2015.01)

(58) Field of Classification Search
CPC ... Y10T 409/30896; Y10T 409/309016; Y10T 409/309576; Y10T 409/30392; Y10S 408/705; B23B 41/02; B23Q 1/10; B23Q 1/126; B23Q 1/127; B23Q 1/128; B23Q 1/621; B23Q 11/08; B23Q 11/0816; B23Q 11/085; B23Q 11/0883; B23Q 2003/15537
USPC ............. 409/163, 165, 221, 224, 225, 134; 408/97, 705
See application file for complete search history.

(56) References Cited

U.S. PATENT DOCUMENTS

| | | | |
|---|---|---|---|
| 9,533,390 B2* | 1/2017 | Canuto | B23B 41/02 |
| 2002/0051687 A1* | 5/2002 | Harami | B23Q 1/4857 409/137 |
| 2003/0044247 A1* | 3/2003 | Wolfe | B23B 41/02 408/97 |
| 2004/0045146 A1* | 3/2004 | Studemann | B23Q 1/017 29/27 C |
| 2005/0271488 A1* | 12/2005 | Liechti | B23Q 5/10 409/221 |
| 2015/0023752 A1* | 1/2015 | Matsuyama | B23Q 11/0067 409/137 |
| 2015/0043985 A1* | 2/2015 | Otani | B23F 5/163 409/56 |
| 2015/0174721 A1* | 6/2015 | Yeh | B23Q 11/1015 409/136 |
| 2019/0030666 A1* | 1/2019 | Haueter | B23Q 1/4857 |
| 2019/0193218 A1* | 6/2019 | Bauer | B23Q 1/4852 |
| 2019/0275627 A1* | 9/2019 | Wang | F16N 29/02 |

* cited by examiner

MACHINING STATION

CROSS-REFERENCE TO RELATED APPLICATIONS

This application is a 371 of PCT/IB2019/057287, filed Aug. 29, 2019, which claims the benefit of Portuguese Patent Application No. 111113, filed Aug. 29, 2018, each of which are incorporated herein by reference.

FIELD OF THE ART

The present application describes a machining station for carrying out milling and deep drill operations.

BACKGROUND

Currently, it is noted that current machining stations present a structural, horizontal or vertical arrangement, endowed with 5 axes—axes in the space X, Y and Z, and also two rotary axes of the machining table, for example on planes XY or XZ. The axis in charge of the drill operation is, in any case, referred to as being axis z, which implies a vertical structural arrangement, to a reorientation of axes according to this standard. What is noted in machining stations of the state of the art is that the structural arrangement they present largely limits their operability in carrying out the tasks of deep drilling according to the drilling axis, axis Z.

This is due to the fact that current machining stations are devoid of an axis dedicated exclusively to the drill operation, so the consequent structural arrangement they present does not enable the installation of the necessary support tools in accordance with the specifications of suppliers of deep drill tools. This fact imposes a limit on the size (length) of the tool to be used in the deep drill operation, to the structural restriction that is noted in the course of the axis Z, which in practice translates into a limitation in the machining of the part. For example: if the center of the machining has a course of axis Z of 500 mm, and the position being further away from the machining table of 700 mm, if the part to be operated is 400 mm in depth, it is only possible to assemble a tool measuring 300 mm. In other words, the drilling may be limited to 200 mm in depth.

SUMMARY

The present application describes a machining station (1) characterized by comprising:
- an operating base (2) on which there are mounted,
- an operating module (3) and an arrangement module (10), separated by a support structure (7)

Wherein:
- the operating base (2) comprises a set of displacement guides;
- the operating module (3) comprises an operating table (5) installed on a rotating block (4), rotating block which is mounted on at least a displacement guide of the operating base (2);
- the arrangement module (10) comprises a curtain (8) which is coupled to the support structure (7), an arrangement window (9) installed on the curtain (8), said arrangement window (9) having coupled a drill arm (11) which is installed on a mechanical support (15) which in turn is mounted on at least a displacement guide of the operating base (2); said drill arm (11) comprising a drive unit (12) which moves inside said arm.

the operation of the drive unit (12) and respective drill arm (11), as well as the movements of the rotating block (4), of the curtain (8) and of the mechanical support are controlled by way of a central control unit endowed with processing capacity.

In one particular embodiment of the station, the displacement guides of the operating base (2) are installed on plane ZX.

In yet another particular embodiment of the station, the rotating block (4) of the operating table (5) is adapted to provide the operating table with a rotational movement of 360° over plane XZ, and of 135° over plane YZ, and a linear movement along axis Z, by action of the displacement guides of the operating base (2).

In yet another particular embodiment of the station, the movements of the operating block (4) are driven by a mechanical system.

In yet another particular embodiment of the station, the curtain (8) has linear movements along axes X and Y.

In yet another particular embodiment of the station, the mechanical support (15) has installed on its body at least a displacement guide where the drill arm (11) is installed.

In yet another particular embodiment of the station, the at least a displacement guide is installed along axis Y.

In yet another particular embodiment of the station, the at least a displacement guide of the operating base (2) where the mechanical support (15) is mounted, is disposed on axis X.

In yet another particular embodiment of the station, the drive unit (12) of the drill arm (11) moves inside said arm, along axis W, parallel to axis Z.

In yet another particular embodiment of the station, the drill arm (11) comprises
- a door (13), to enable access for an operator to change the drill tool (18), said door (13) adapted to prevent liquids used during machining from passing to the arrangement module (10) of the station;
- coupling mechanisms for installing the drill tool supports (17).

In yet another particular embodiment of the station, the arrangement window (9) comprises at least a drain outlet (14).

In yet another particular embodiment of the station, the drill arm (11) is formed by a slanted drill base (19) such that liquids used during machining return to the operating module (3) by way of the drain outlets (14) of the arrangement window (9).

Lastly, in another particular embodiment of the station, latter additionally comprises a filter unit arranged to clean and filter the liquids used during machining.

GENERAL DESCRIPTION

The present application describes a machining station, endowed with a specific structural arrangement, enabling the incorporation, contrary to already existing stations, of an exclusive axis dedicated to deep drilling, referred to in the present document as axis W. This favors the use of drill tools under ideal conditions of use, without size restriction, which would constitute a limitation of the state of the art.

Accordingly, an objective of the present application is to describe a compact machining station endowed with 6 axes, and especially arranged to carry out deep drill and milling operations. Carrying out said operations, in the context of said compacting, implies interoperability between the elements that make up said station, along multiple displacement axes in the three-dimensional space, and which will be described in detail in the present description.

It is equally an objective of the present application, to describe a machining station that is versatile and configurable, such that the machining operations referred to above can comply with the machining specificities programmed for each part to be machined. A further objective of the present application is to describe a machining station that is operable in the multiple axes of three-dimensional space.

The objectives set out above, as well as the characteristics and advantages of the present application will be described ahead. According to one aspect of the present application, the objectives now described, and/or others that might derive herefrom in an obvious manner, are achieved by way of a compact machining station, built to guarantee the interoperability between the elements that compose it along the multiple axes of displacement in three-dimensional space. With this purpose, the machining station developed is comprised of an operating base, on which there lays an operating module and an arrangement module.

Throughout the present document for effects of technical description, it is considered that drilling axis W is always parallel to axis Z, which implies an axial reorientation based on the vertical or horizontal direction of the drilling axis. To this end, the description of the technical characteristics that make up the machining station will be made to encourage the clear understanding of the concept developed here, considering a horizontal layout for said station, that is with the drilling axis, axis W, being parallel to axis Z according to a horizontal direction. However, it is considered that the technical concept expounded herein, and that allows the development of the 6-axis machining station, will be easily transposed to an embodiment of said station with a vertical layout, with drilling axis W, being parallel to axis Z according to a vertical direction.

According to one aspect of the present application, the operating module comprises an operating table, which is installed on a rotating block mounted on the operating base. The rotating block is adapted to provide the operating table with a rotational movement of 360° over plane XZ and of 135° over plane YZ. Besides the rotational movement applied to the rotating block, latter has a linear movement along axis Z, by the assembly of the rotating block on at least a displacement guide, which is installed on the operating base. Both the rotational movements of the operating table and the linear movement of the operating block are driven by a mechanical system.

According to another aspect of the present application, the machining station comprises a support structure, which lays on the operating base and which separates the operating and arrangement modules. This separation is made by way of coupling a curtain, belonging to the arrangement module, to the support structure, making the physical division between said modules. The curtain has the freedom of linear movements towards axes X and Y, and these movements are driven by a mechanical system.

Further according to one aspect of the present application, the machining station developed additionally comprises an arrangement module. Latter, in addition to the curtain, comprises a drill arm, which has coupled, on one of its ends, an arrangement window, designed to promote the connection of said arm to the curtain, so as to carry out the machining action in the operating module. The drill arm is installed on the operating base by way of a mechanical support, which has mounted on its body at least a vertical displacement guide, on which the drill arm lays to present a linear movement towards the axis Y. Said mechanical support is mounted on at least a displacement guide on the operating base, which equally confers the drill arm, linear movements along axis X. The linear movements of the drill arm and of the mechanical support are driven by a mechanical system. Therefore, the arrangement window and respective drill arm move in solidarity with the curtain, which enables the creation of two independent spaces—operation and arrangement—preventing liquids, debris or dust formed in the operating module from passing to the arrangement module.

The drill arm is arranged to carry out the milling or deep drill operations, being comprised of a drive unit, hereinafter referred to as tree, which moves inside said arm, along axis W, parallel to axis Z. The drill arm further includes an arrangement window, and this window enables the tree to perform the milling and drilling works in the operating module. Accordingly, the drill arm is endowed with coupling mechanisms that enable the installation of at least a drill flange on the arrangement window and of the respective tool supports, comprised of dampers, which assist the drill tool to carry out the deep drill operation. The assembly of the supports obliges the tree to displace to the rearmost position—opposite the arrangement window. In contrast, for the milling operation, no support is installed on the drill arm, leading to the displacement of the tree to the forwardmost position, next to the arrangement window, making the direct coupling of the milling tool to the tree, manually (by the operator) or automatically by operation of external robotic systems. To this end, the structure is endowed with an automatically-opening door which enables access inside of the station for said robotic systems.

The drill arm is endowed with a door having the objective, besides enabling the operator to make the change of the drill tool, of preventing liquids—oil or cutting emulsion—from passing to the arrangement module of the station. In order to prevent these from building up inside the drill arm, the construction of the body of the structure of the drill base thereof is slightly slanted so that the liquids return to the operating module, by way of drain outlets installed on the arrangement window of the drill arm, so they can be reused. Accordingly, the machining station is equally composed of a filter module, with the purpose of cleaning and filtering the oil/cutting emulsion used during machining, whereby guaranteeing the reuse thereof.

The entire operation of the machining station developed, both in terms of control of the milling or deep drill operations, as in regards to programming the movements in the three-dimensional space of all its elements, with the operation of mechanical systems and respective pneumatic, hydraulic and electric mechanisms, is carried out by way of a central control unit.

BRIEF DESCRIPTION OF THE DRAWINGS

The accompanying drawings are for an easier understanding of the present application, representing preferred embodiments, but are not intended to limit the art disclosed herein.

6—robotic system for changing milling tools;
7—support structure;
8—curtain;
9—arrangement window;
10—arrangement module;
11—drill arm;
15—mechanical support;
16—drill flange.

Figure 1:
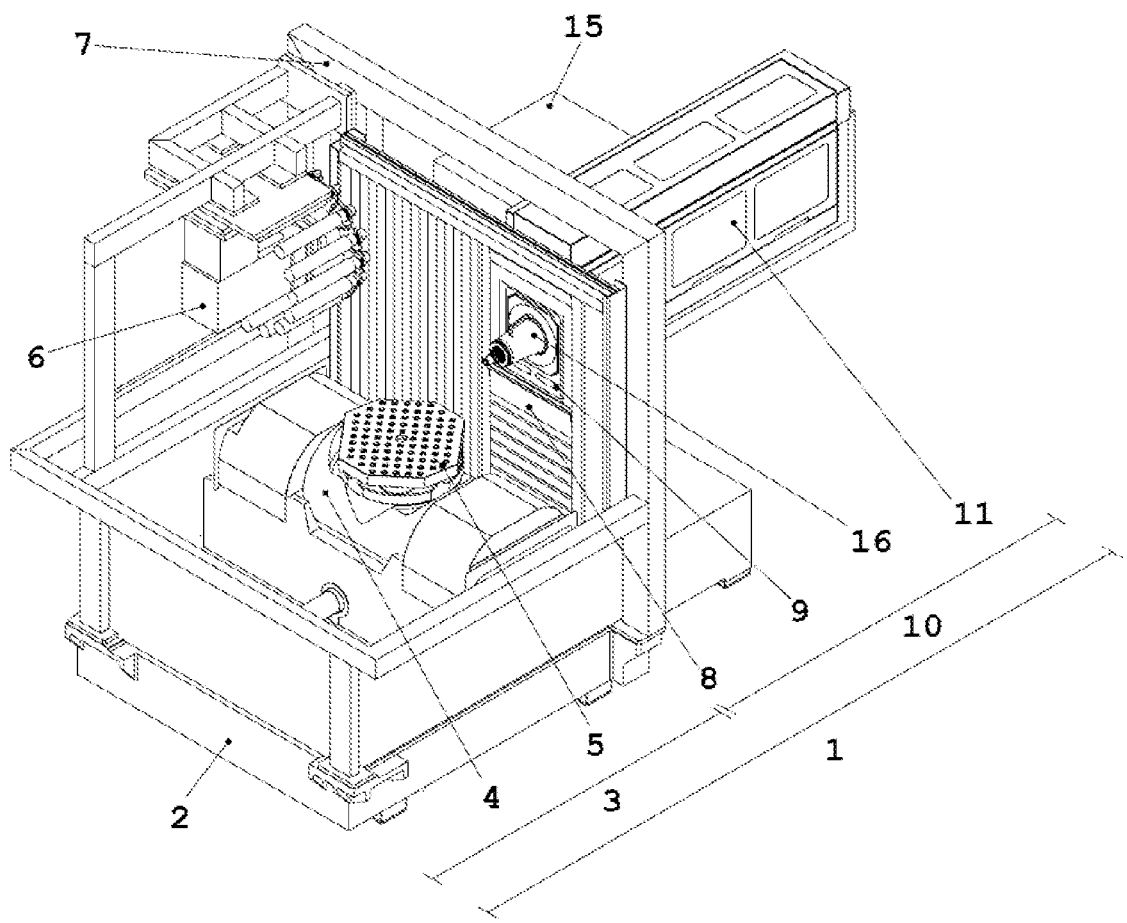
FIG. 1 illustrates an embodiment of the machining station developed, wherein the reference numbers represent:
   1—machining station;
   2—operating base;
   3—operating module;
   4—rotating block;
   5—operating table.
Figure 2:
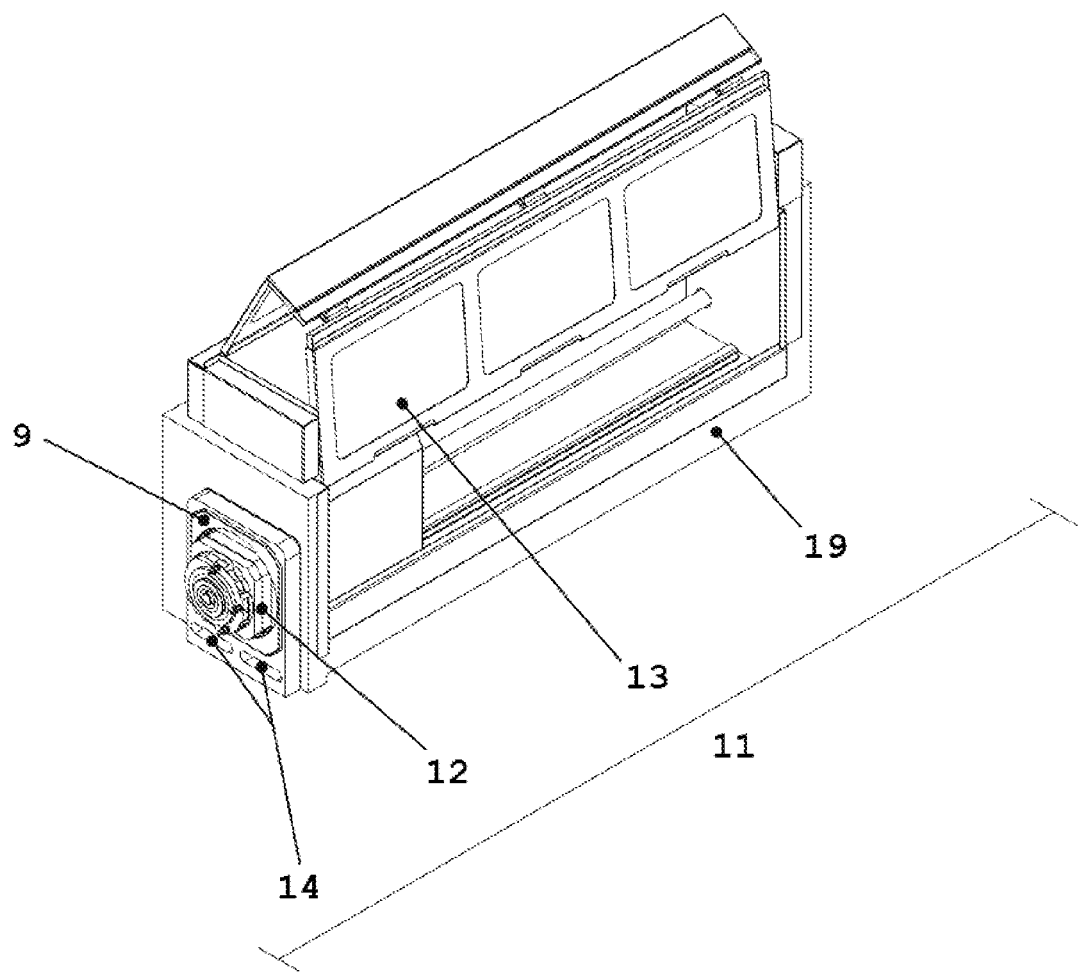

FIG. 2 illustrates the arrangement of the drill arm of the arrangement module of the machining station developed, for carrying out the milling operation, wherein the reference numbers represent:
9—arrangement window;
11—drill base;
12—tree;
13—access door to the drill tool;
14—drain outlet;
19—drill base structure.

Figure 3:
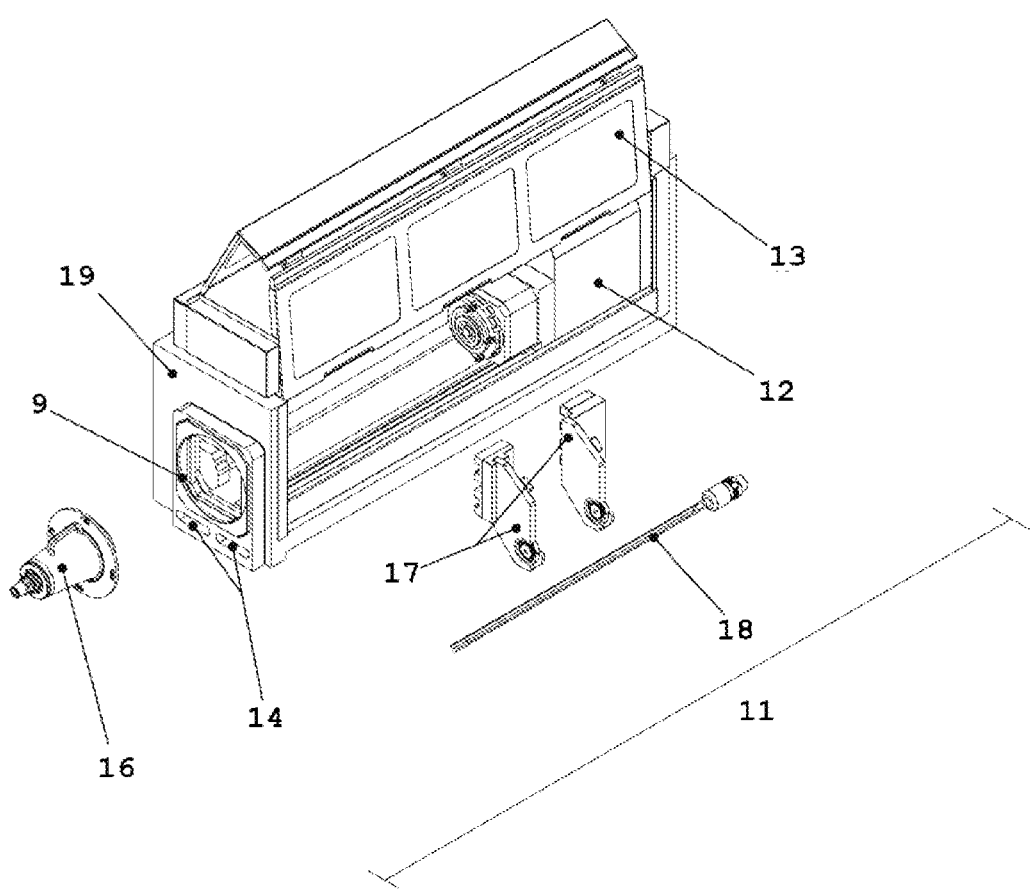

FIG. 3 illustrates the arrangement of the drill arm of the arrangement module of the machining station developed, for carrying out the deep drill operation, wherein the reference numbers represent:
9—arrangement window;
11—drill arm;
12—tree;
13—access door to the drill tool;
14—drain outlet;
16—drill flange;
17—deep drill tool support;
18—deep drill tool;
19—drill base structure.

DESCRIPTION OF EMBODIMENTS

With reference to the drawings, some embodiments are now described in greater detail, though they are not intended to limit the scope of the present application.

In one embodiment of the machining station (1), latter is comprised of an operating base (2), on which there are installed an operating module (3) and an arrangement module (10). Both modules are physically separated by a curtain (8) coupled to a support structure (7) which lays on the operating base (2).

In one embodiment of the machining station (1), the operating module (3) comprises an operating table (5), which is installed on a rotating block (4) mounted on the operating base (2). The rotating block (4) is adapted to provide the operating table (5) with a rotational movement of 360° over plane XZ and of 135° over plane YZ. In addition to the rotational movement applied to the rotating block (4), latter has a linear movement along axis Z, by the assembly of the rotating block (4) on two displacement guides installed on the operating base (2). Both the rotational movements of the operating table (5) and the linear movement of the operating block (4) are driven by a mechanical system.

In one particular embodiment of the machining station (1), the arrangement module (10) comprises a curtain (8), a drill arm (11), which has coupled at one of its ends an arrangement window (9), designed to promote the connection of said arm (11) to the curtain (8), so as to carry out the machining action in the operating module (3). The drill arm (11) is coupled to the operating base (2) by way of a mechanical support (15), which has installed on its body two vertical displacement guides, on which the drill arm (11) lays so as to present a linear movement towards axis Y. Said mechanical support (15) is mounted on a displacement guide on the operating base (2), which equally confers the drill arm (11) linear movements along axis X. The linear movements of the drill arm (11) and of the mechanical support (15) are driven by a mechanical system.

In one embodiment, the drill arm (11) is arranged to carry out the milling or deep drill operations, always comprised by a drive unit, hereinafter referred to as tree (12), which moves inside said arm (11), along axis W, parallel to axis Z. The drill arm (11) further includes an arrangement window (9), and this window enables the tree (12) to perform the milling and drilling works. Accordingly, in the case of the deep drill task, the drill arm (11) is endowed with coupling mechanisms, which enable the installation of a drill flange (16) on the arrangement window (9). The assembly of the respective supports (17) of the deep drill tool (18) obliges the tree (12) to move to its rearmost position—opposite the arrangement window (9). In contrast, for the milling operation, no support is installed on the drill arm (11), leading to the displacement of the tree (12) to its forwardmost position, next to the arrangement window (9), making the direct coupling of the milling tool to the tree (12), manually (by the operator) or automatically by operation of external robotic systems (6). To this end, the structure is endowed with an automatically-opening door, which enables access inside of the station (1) and to said robotic systems (6).

In one particular embodiment, the drill arm (11) is endowed with a door (13) having the objective, in addition to enabling the operator to make the change of the drill tool (18), of preventing the liquids—oil or cutting emulsion—from passing to the arrangement module (10) of the station. In order to prevent these from building up inside the drill arm (11), the construction of the body of the drill base structure (19) thereof is slightly slanted so that the liquids return to the operating module (3), by way of drain outlets (14) installed on the arrangement window (9) of the drill arm (11), so they can be reused.

In one particular embodiment of the machining station (1), latter additionally comprises a filter module, with the purpose of cleaning and filtering the oil/cutting emulsion used during machining, whereby guaranteeing the reuse thereof.

Naturally, the present description is in no way restricted to the embodiments presented in this document and a person with average skill in the art will be able to envisage many possibilities of modifying the same without straying from the general idea, as defined in the claims. The preferred embodiments described above are obviously mutually combinable. The following claims additionally define preferred embodiments.

The invention claimed is:
1. A machining station comprising:
an operating base on which there are mounted:
an operating module and an arrangement module, separated by a support structure;
the operating base comprises a set of displacement guides;
the operating module comprises an operating table installed on a rotating block, which is mounted on the set of displacement guides of the operating base;
the arrangement module comprises a curtain which is coupled to the support structure, an arrangement window installed on the curtain, said arrangement window having coupled a drill arm which is installed on a mechanical support which in turn is mounted on the set of displacement guides of the operating base; said drill arm comprising a drive unit which moves inside said arm;

the drive unit, the drill arm, the rotating block, the curtain and the mechanical support are controlled by way of a central control unit endowed with processing capacity, wherein the arrangement window comprises at least one drain outlet, the drill arm comprising a door to enable access for an operator to change a drill tool, and coupling mechanisms for installing drill tool supports, said door being adapted to prevent liquids, used during a machining procedure, from passing to the arrangement module of the station, and a slanted drill base such that liquids used during the machining procedure return to the operating module by way of the at least one drain outlet of the arrangement window.

2. The station according to claim 1, wherein the set of displacement guides of the operating base are installed on a ZX plane.

3. The station, according to claim 1, wherein the rotating block of the operating table, is adapted to provide the operating table with a rotational movement of 360° over a ZX plane, and of 135° over a YZ plane, and a linear movement along a Z axis, by action of the set of displacement guides of the operating base.

4. The station according to claim 3, wherein the rotating block is driven by a mechanical system.

5. The station according to claim 1, wherein the curtain has linear movements along axes X and Y.

6. The station according to claim 5, wherein a second set of displacement guides is installed along the Y axis.

7. The station according to claim 5, wherein the set of displacement guides of the operating base where the mechanical support is mounted, is disposed on the X axis.

8. The station according to claim 1, wherein the mechanical support has installed on its body a second set of displacement guides where the drill arm is installed.

9. The station according to claim 1, wherein the drive unit of the drill arm moves inside said arm, along a W axis, parallel to a Z axis.

10. The station according to claim 1, comprising a filter unit arranged to clean and filter the liquids used during the machining procedure.

* * * * *